(12) United States Patent
Ryu et al.

(10) Patent No.: US 10,046,968 B2
(45) Date of Patent: Aug. 14, 2018

(54) HIGH TEMPERATURE DRY DESULFURIZATION SYSTEM AND METHOD USING MULTI REGENERATION REACTOR

(71) Applicant: KOREA INSTITUTE OF ENERGY RESEARCH, Daejeon (KR)

(72) Inventors: Ho-jung Ryu, Daejeon (KR); Dong-ho Lee, Daejeon (KR); Gyoung-tae Jin, Daejeon (KR); Do-won Shun, Daejeon (KR); Chang-keun Yi, Daejeon (KR); Jae-hyeon Park, Daejeon (KR); Dal-hee Bae, Sejong-si (KR); Sung-ho Jo, Daejeon (KR); Seung-yong Lee, Daejeon (KR); Young Cheol Park, Daejeon (KR); Jong-ho Moon, Seoul (KR); Hyo Jin Lee, Daejeon (KR); Jeom In Baek, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 66 days.

(21) Appl. No.: 15/232,987

(22) Filed: Aug. 10, 2016

(65) Prior Publication Data
US 2017/0044014 A1   Feb. 16, 2017

(30) Foreign Application Priority Data
Aug. 11, 2015 (KR) .......... 10-2015-0113195

(51) Int. Cl.
*B01D 53/50* (2006.01)
*C01B 3/56* (2006.01)
(Continued)

(52) U.S. Cl.
CPC ............. *C01B 3/56* (2013.01); *B01D 53/10* (2013.01); *B01D 53/24* (2013.01); *C01B 17/0486* (2013.01); *C01B 17/0491* (2013.01); *C10J 3/82* (2013.01); *B01D 2253/1124* (2013.01); *B01D 2257/304* (2013.01); *B01D 2257/308* (2013.01); *C01B 2203/043* (2013.01); *C10J 2300/093* (2013.01); *Y02E 20/16* (2013.01); *Y02E 20/18* (2013.01)

(58) Field of Classification Search
None
See application file for complete search history.

(56) References Cited

FOREIGN PATENT DOCUMENTS

| KR | 100219366 | 6/1999 |
| KR | 20080095069 | 10/2008 |

(Continued)

*Primary Examiner* — Walter Dean Griffin
*Assistant Examiner* — Jelitza M Perez
(74) *Attorney, Agent, or Firm* — Allen, Dyer, Doppelt, + Gilchrist, P.A. Attorneys at Law (57) ABSTRACT

A desulfurization system removes sulfur ingredients included in synthetic gas generated from gasification of coal in a high temperature dry state. The system includes a desulfurization reactor, a desulfurization cyclone, and first and second regeneration reactors branched with the desulfurization cyclone. A first oxidizing agent is injected to a first oxidizing agent inlet of the first regeneration reactor, and a second oxidizing agent is injected to a second oxidizing agent inlet of the second regeneration reactor. A controller operates one of the first and second regeneration reactors in a regeneration mode, controlling the other to operate in a desulfurization mode.

7 Claims, 9 Drawing Sheets

(51) Int. Cl.
*B01D 53/10* (2006.01)
*C01B 17/04* (2006.01)
*C10J 3/82* (2006.01)
*B01D 53/24* (2006.01)

(56) References Cited

FOREIGN PATENT DOCUMENTS

| | | |
|---|---|---|
| KR | 20090047961 | 5/2009 |
| KR | 101069191 | 9/2011 |
| KR | 101322369 | 10/2013 |
| KR | 101330126 | 11/2013 |
| KR | 101398191 | 5/2014 |
| KR | 20140078039 | 6/2014 |

HIGH TEMPERATURE DRY DESULFURIZATION SYSTEM AND METHOD USING MULTI REGENERATION REACTOR

FIELD

The present disclosure relates to a high temperature dry desulfurization system and method using a multi-regeneration reactor.

BACKGROUND

High temperature dry desulfurization technology is technology removing sulfur ingredients such as $H_2S$, COS in fuel gas generated from coal gasification or synthetic gas at a high temperature with a dry state. The high temperature dry desulfurization technology has an advantage of having no waste water treatment in an environmental aspect compared to low temperature wet desulfurization technology using absorbent of amine type which is widely used in a general chemical plant, where a sulfur ingredient may be removed in high temperatures of 400-600° C., cooling of the synthetic gas may not be needed compared to the wet desulfurization technology operated at low temperature (below 100° C.), reducing sensible heat, thereby increasing power generation efficiency.

In particular, in the case of an Integrated Gasification Combined Cycle (IGCC), sulfur ingredients included in fuel gas must be reduced less than dozens of ppmv in order to prevent corrosion of a gas turbine, and in the case of an Integrated Gasification Fuel Cell (IGFC) sulfur must be reduced to ppbv level in order to prevent poisoning of catalyst and degradation of the electrode.

The high temperature dry desulfurization technology is technology which selectively absorbs $H_2S$ and COS when high temperature and high pressure fuel gas (or synthetic gas) contacts with a desulfurizing agent in a solid state. Composition of synthetic gas emitted by coal gasification may be changed according to the type of the coal gasification and composition of coal; however, representatively, composition of synthetic gas emitted by a coal gasifier of Shell is 65% of CO, 1.5% of $CO_2$, 29.5% of $H_2$, 4% of $N_2$ and also includes $H_2S$ and COS.

Figure 1:
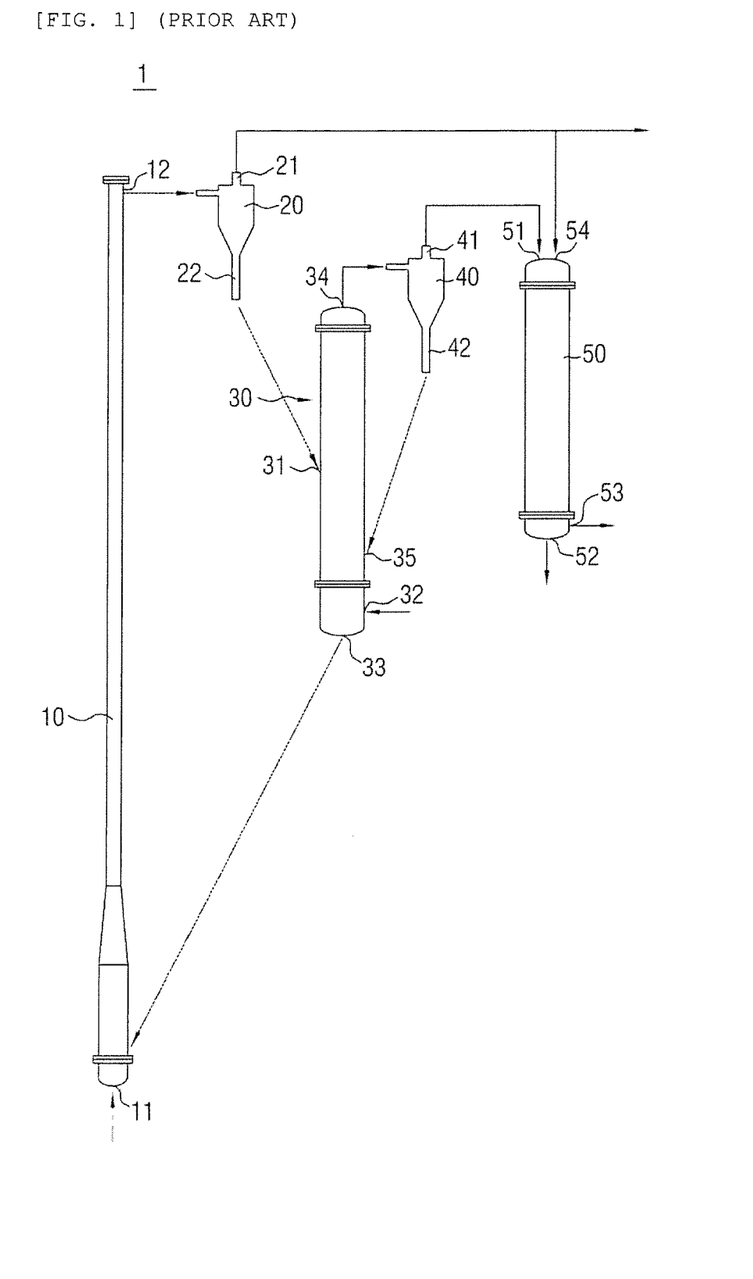
FIG. 1 is a diagram of a conventional apparatus for desulfurization.
Figure 2:
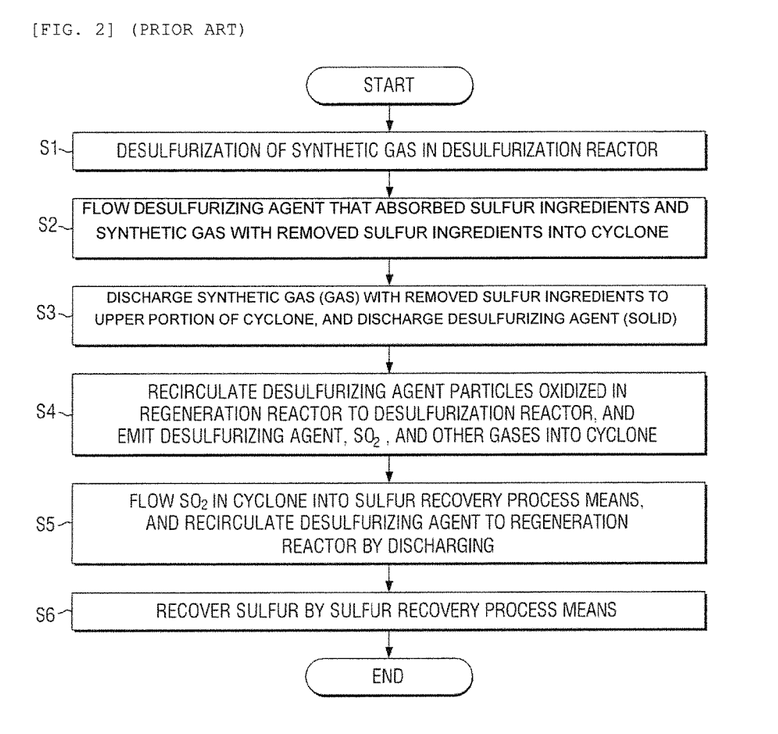
FIG. 2 is a flowchart of an operating method of the conventional apparatus for desulfurization.

FIG. 1 illustrates a diagram of a conventional apparatus for desulfurization and FIG. 2 illustrates a flowchart of an operating method of the conventional apparatus for desulfurization. Like this, in order to remove sulfur ingredients in the synthetic gas, the high temperature dry desulfurization technology, as illustrated in FIG. 1, includes two reactors, that is, a desulfurization reactor and a regeneration reactor. As illustrated in FIG. 1, the synthetic gas including the sulfur ingredients is injected through a synthetic gas inlet of a lower portion of the desulfurization reactor, and is to be contacted with solid desulfurizing agent particles which enable removing the sulfur ingredients in the reactor. For the desulfurizing agent, Zn, Fe, Ni, Co, Mn, Ce, or oxide thereof, or mixtures thereof are used, or bentonite, alumina, zeolite, silica, hexaaluminate, zirconia, or depressor fabricated by using mixtures thereof as a support may be used.

Representatively, in the case that Zinc oxide is used as the desulfurizing agent, within the desulfurization reactor, the sulfur ingredients $H_2S$ and COS are absorbed into the desulfurizing agent by the reaction such as the following Formula 1 and Formula 2 and are to be emitted as $H_2O$ or $CO_2$.

$$H_2S+ZnO=ZnS+H_2O \quad \text{[Formula 1]}$$

$$COS+ZnO=ZnS+CO_2 \quad \text{[Formula 2]}$$

Further, the desulfurizing agent that absorbed the sulfur ingredients and the synthetic gas with the removed the sulfur ingredients are emitted through outlet 12 of an upper portion of desulfurization reactor 10 and flowed into a desulfurization cyclone 20 (S2), and the synthetic gas with the removed the sulfur ingredients are divided into gas and solid in the desulfurization cyclone 20 and the gas is emitted through gas outlet 21 of an upper portion of the desulfurization cyclone, and desulfurizing agent particles (solid) that absorbed the sulfur are emitted through solid outlet 22 of a lower portion of the desulfurization cyclone and are introduced to the regeneration reactor 30 (S3).

In the regeneration reactor 30, ZnO and $SO_2$ are obtained by oxidizing ZnS by injecting oxidizing agent (oxygen or air) to oxidizing agent inlet 32 of a lower portion of the regeneration reactor as like below Formula 3, and oxidized desulfurizing agent particles are recirculated to the desulfurization reactor by discharging them from the desulfurizing agent outlet 33.

$$ZnS+1.5\ O_2=ZnO+SO_2 \quad \text{[Formula 3]}$$

The desulfurizing agent emitted from the regeneration reactor 30, SO2, and other gases are introduced in regeneration cyclone 40 by emitting them through regeneration reactor outlet 34 (S4), SO2, and other gases are emitted through gas outlet 41 of an upper portion of the regeneration cyclone by dividing air and solid in the regeneration cyclone 40, and the desulfurizing agent recirculates from the solid outlet 42 of a lower portion of the regeneration cyclone 40 and is flowed into recirculation inlet 35 of the regeneration reactor (S5).

In addition, $SO_2$ and other gases emitted in the regeneration reactor 30 and emitted through the gas outlet of the regeneration cyclone as illustrated in FIG. 1, are introduced in the Direct Sulfur Recovery Process (DSRP) reactor 50, and within sulfur recovery reactor 50 charged with catalyst, they are recovered through sulfur outlet 52 in a form of elemental S by a reaction of the following Formulas 4 and 5, and air $CO_2$ and $H_2O$ are emitted through gas outlet 53 (S6).

$$SO_2+2CO=2CO_2+S \quad \text{[Formula 4]}$$

$$SO_2+2H_2=2H_2O+S \quad \text{[Formula 5]}$$

In the sulfur recovery reactor 50, reductive gases CO, H2, etc., which are needed to direct the sulfur recovery reaction may be injected separately; however, CO and H2 included with the synthetic gas may be used, therefore, as illustrated in FIG. 1, part of the synthetic gas with removed sulfur ingredients emitted through the gas outlet 21 of the desulfurization cyclone 20 may be used.

For this high temperature dry desulfurization technology, because desulfurizing agent having solid particles must continuously circulate between the desulfurization reactor 10 and the regeneration reactor 30, a fluidized bed type reactor is generally used, and in the case of the direct sulfur recovery process, a fixed bed type reactor charged with the catalyst is mostly used.

In a high temperature dry desulfurization apparatus like FIG. 1, oxygen is needed to regenerate the desulfurizing agent that absorbed the sulfur ingredients, because air injection is advantageous with respect to cost rather than pure oxygen injection, the air injection is common in general.

In the case of the air injection, air may must be injected with as much oxygen as needed for the regeneration reaction of the desulfurizing agent; however, it may be changed only within the scope of the change of gas velocity of the regeneration reactor 30 to be operated in a fluidized bed state, and excess oxygen injection is advantageous in order to complete regeneration of the desulfurizing agent, therefore, in gas emitted in the regeneration reactor 30 and flowed into the direct sulfur recovery process the oxygen is to be included with $SO_2$.

In the case that the oxygen is injected in the direct sulfur recovery process, reductive gas which is to reduce $SO_2$ to elemental S is consumed because a combustion reaction of CO and $H_2$ as like following Formulas 6 and 7 is to occur rather than the reaction in aforementioned Formulas 4 and 5, therefore, sulfur recovery efficiency may be decreased, and the combustion reaction of CO and H2 is the exothermic reaction, and a temperature of the catalyst layer is increased drastically, therefore, decreased activity by thermal shock and deterioration of catalyst may occur.

$$CO + 0.5\ O_2 = CO_2 \qquad \text{[Formula 6]}$$

$$H_2 + 0.5\ O_2 = H_2O \qquad \text{[Formula 7]}$$

Therefore, in the case that the oxygen is flowed into the direct sulfur recovery process, efficiency of a catalyst reaction may be decreased and it may influence stability of the process, therefore, it is important to minimize the flowed oxygen concentration. However, in order to increase efficiency of the regeneration of the high temperature dry desulfurization process regeneration reactor 30, a high oxygen concentration is advantageous; therefore, a method for increasing efficiency of both processes was required.

RELATED ART DOCUMENT

Patent Document (Patent Document 1) Korean Patent Registration No. 219366
(Patent Document 2) Korean Patent Registration No. 1322369
(Patent Document 3) Korean Patent Registration No. 1330126
(Patent Document 4) Korean Patent Registration No. 1398191

SUMMARY

Therefore, the present disclosure has been made in an effort to overcome the conventional difficulty, according to an exemplary embodiment of the present disclosure, flowing oxygen into the direct sulfur recovery process may be prevented, smooth regeneration of the desulfurizing agent therefrom in the high temperature dry desulfurization process reactor may be possible, and supplying high temperature dry desulfurization having a multi-regeneration reactor which enables preventing a decrease of sulfur recovery efficiency by oxygen injection to the direct sulfur recovery process and decreased activity by the deterioration of catalyst. A desulfurization system, and operating method thereof are provided.

Meanwhile, technical objects to be achieved in the present disclosure are not limited to the aforementioned technical objects, and other not-mentioned technical objects will be obviously understood by those skilled in the art from the description below.

The present disclosure provides in a desulfurization system for removing sulfur ingredients included with a synthetic gas generated from gasification of coal in a high temperature dry state, a desulfurization reactor removing sulfur ingredients of the synthetic gas by desulfurizing agent; a desulfurization cyclone discharging by separating synthetic gas with removed sulfur ingredients discharged in the desulfurization reactor and a desulfurizing agent that absorbed sulfur ingredients; at least one first regeneration reactor branched with the desulfurization cyclone and regenerating the desulfurizing agent that absorbed the sulfur ingredients by flowing the desulfurizing agent that absorbed the discharged sulfur ingredients; at least one second regeneration reactor branched with the desulfurization cyclone and regenerating the desulfurizing agent that absorbed the sulfur ingredients by flowing the desulfurizing agent that absorbed discharged sulfur ingredients; a first oxidizing agent supplying means injecting oxidizing agent to a first oxidizing agent inlet of the first regeneration reactor, a second oxidizing agent supplying means injecting oxidizing agent to a second oxidizing agent inlet of the second regeneration reactor; a first inlet valve provided at a side of a first regeneration reactor inlet pipe between the desulfurization cyclone and a first solid inlet of the first regeneration reactor; a first outlet valve provided at a first desulfurization outlet of the first regeneration reactor; a second inlet valve provided at a side of a second regeneration reactor inlet pipe between the desulfurization cyclone and a second solid inlet of the second regeneration reactor; a second outlet valve provided at a second desulfurization agent outlet of the second regeneration reactor; a controller operating one of the first regeneration reactor and the second regeneration reactor in a regeneration mode, controlling the other to operate in a desulfurization mode by circulating desulfurizing agent between the desulfurization reactors, in the case of operating the first regeneration reactor in the regeneration mode, closing the first inlet valve and the first outlet valve, operating the first oxidizing agent supplying means, in the case of operating the second regeneration reactor in a regeneration mode, closing the second inlet valve and the second outlet valve, controlling the second oxidizing agent supplying means to operate; a first regeneration cyclone separating gas and solid discharged through a first recirculation outlet of the first regeneration reactor and recirculating the solid through a first recirculation inlet of the first regeneration reactor when the first regeneration reactor operates in a regeneration mode; a second regeneration cyclone separating gas and solid discharged through a second recirculation outlet of the second regeneration reactor recirculating the solid through a second recirculation inlet of the second regeneration reactor when the second regeneration reactor operates in a regeneration mode; a first measuring sensor measuring whether oxygen is discharged in the first regeneration reactor when the first regeneration reactor operates in a regeneration mode; and in the case that the second regeneration reactor operates in the regeneration mode, a second measuring sensor which measures whether oxygen is discharged in the second regeneration reactor, the controller determines whether the regeneration mode of the first regeneration reactor ceases based on a measurement value of the first measuring sensor, determines whether the regeneration mode of the second regeneration reactor ceases based on a measurement value of the second measuring sensor, in the case that the first regeneration reactor operates in the regeneration mode, gas including desulfurizing agent discharged by the first regeneration reactor and sulfur is flowed into the first regeneration cyclone, the desulfurization agent discharged by the solid outlet of the first regeneration cyclone recirculates to the first regeneration reactor, the gas including sulfur is flowed into sulfur recovery reactor, in the case that the second regeneration reactor operates in the regeneration mode, air including desulfurizing agent discharged in the second regeneration reactor and sulfur is flowed into the second regeneration cyclone, the desulfurization agent discharged by the solid outlet of the second regeneration cyclone recirculates to the second regeneration reactor, the gas including sulfur is flowed into the sulfur recovery reactor.

In an operating method of the high temperature dry desulfurization system removing sulfur from synthetic gas generated from the gasification of coal in the high temperature dry state, a first stage putting the desulfurizing agent into the desulfurization reactor by opening the first inlet valve of the first regeneration reactor and the first outlet valve, and opening the second inlet valve of the second regeneration valve and the second outlet valve; a second stage operating the first regeneration reactor in the regeneration mode by putting oxidizing agent into the first regeneration reactor by closing the first inlet valve and the first outlet valve and driving the first oxidizing agent supplying means and progressing the desulfurization reaction by circulating the desulfurizing agent between the second regeneration reactor and the desulfurization reactor; a third stage operating the second regeneration reactor in the regeneration mode by putting oxidizing agent into the second regeneration reactor by closing the second inlet valve and the second outlet valve when the regeneration reaction of the first regeneration reactor is ended, and driving the second oxidizing agent supplying means and progressing the desulfurization reaction by circulating the desulfurizing agent between the first regeneration reactor and the desulfurization reactor; a fourth stage repeating the second stage and the third stage.

Further, the first stage provides controlling the controller to close the first inlet valve, the first outlet valve, the second inlet valve, and the second outlet valve, charging the desulfurizing agent in the first regeneration reactor and in the second regeneration reactor; circulating the desulfurizing agent in the first regeneration reactor between the desulfurization reactor by controlling the controller to open the first inlet valve and the first outlet valve; and circulating the desulfurizing agent in the second regeneration reactor between the desulfurization reactor by controlling the controller to open the second inlet valve and the second outlet valve.

In addition, the second stage, includes operating the first regeneration reactor in the regeneration mode by regenerating desulfurizing agent by oxidizing agent injected within the first regeneration reactor operated in the regeneration mode; flowing gas including the desulfurizing agent and sulfur into the first regeneration cyclone through the first recirculation outlet of the first regeneration reactor; regenerating the desulfurizing agent by circulating the first regeneration reactor through the solid outlet of the first regeneration cyclone; and recovering sulfur by flowing the gas including sulfur through the gas outlet of the first regeneration cyclone; the second regeneration reactor being operated in the desulfurization mode by controlling the sulfur ingredients of the synthetic gas put in the desulfurization reactor by flowing the desulfurizing agent within the second regeneration reactor into the desulfurization reactor, flowing the desulfurizing agent that absorbed the sulfur ingredients and the synthetic gas with the removed sulfur ingredients into the desulfurization cyclone, emitting the synthetic gas with the removed sulfur ingredients to the gas outlet of the desulfurization cyclone and circulating the desulfurizing agent that absorbed the sulfur ingredients by flowing it into the second regeneration reactor.

Further, the method includes measuring whether the first measuring sensor of the first regeneration reactor discharges the oxygen in the first regeneration reactor, determining using the controller whether the regeneration reaction of the first regeneration reactor is terminated based on the measurement value of the first measuring sensor.

In addition, in the third stage, the second regeneration reactor is operated in the regeneration mode by regenerating desulfurizing agent by oxidizing agent injected within the second regeneration reactor operated in the regeneration mode; flowing gas including the desulfurizing agent and sulfur into the second regeneration cyclone through the second recirculation outlet of the second regeneration reactor; regenerating the desulfurizing agent by circulating the second regeneration reactor through the solid outlet of the second regeneration cyclone; and recovering sulfur by flowing the gas including sulfur through the gas outlet of the second regeneration cyclone; the first regeneration reactor being operated in the desulfurization mode by controlling the sulfur ingredients of the synthetic gas put in the desulfurization reactor by flowing the desulfurizing agent within the second regeneration reactor into the desulfurization reactor, flowing the desulfurizing agent that absorbed the sulfur ingredients and the synthetic gas with the removed sulfur ingredients into the desulfurization cyclone, emitting the synthetic gas with the removed the sulfur ingredients to the gas outlet of the desulfurization cyclone and circulating the desulfurizing agent that absorbed the sulfur ingredients by flowing it into the first regeneration reactor.

Further, the method includes measuring whether the second measuring sensor of the second regeneration reactor discharges the oxygen in the second regeneration reactor, determining using the controller whether the regeneration reaction of the second regeneration reactor is terminated based on the measurement value of the second measuring sensor.

In accordance with configuration of an operating method according to an exemplary embodiment of the present disclosure, the flowing of oxygen into the direct sulfur recovery process may be prevented and the smooth regeneration of desulfurizing agent therefrom in the high temperature dry desulfurization process reactor may be possible and decreasing sulfur recovery efficiency by the oxygen injection to the direct sulfur recovery process and with decreased activity by the deterioration of the catalyst may be prevented.

Meanwhile, effects to be achieved in the present disclosure are not limited to the aforementioned effects, and other not-mentioned effects will be obviously understood by those skilled in the art from the description below.

BRIEF DESCRIPTION OF THE DRAWINGS

The accompanying drawings in the specification illustrate an exemplary embodiment of the present disclosure. The technical spirit of the present disclosure will be more clearly understood from the following detailed description taken in conjunction with the accompanying drawings. Therefore, the present disclosure will not be interpreted to be limited to the drawings.

DETAILED DESCRIPTION

The above objects, other objects, features and other advantages of the present disclosure will be more clearly understood from the following detailed description taken in conjunction with the accompanying drawings. However, the present disclosure is not limited to the described embodiments, but may be embodied in different ways. On the contrary, exemplary embodiments introduced herein are provided to make disclosed contents thorough and complete and sufficiently transfer the spirit of the present invention to those skilled in the art.

Hereinafter, a configuration and functions, and an operating method of a high temperature dry desulfurization system having a multi-regeneration reactor 100 will be described. First, FIG. 3 illustrates the diagram of high temperature dry desulfurization system having a multi-regeneration reactor 100 according to an exemplary embodiment of the present disclosure.

Figure 3:
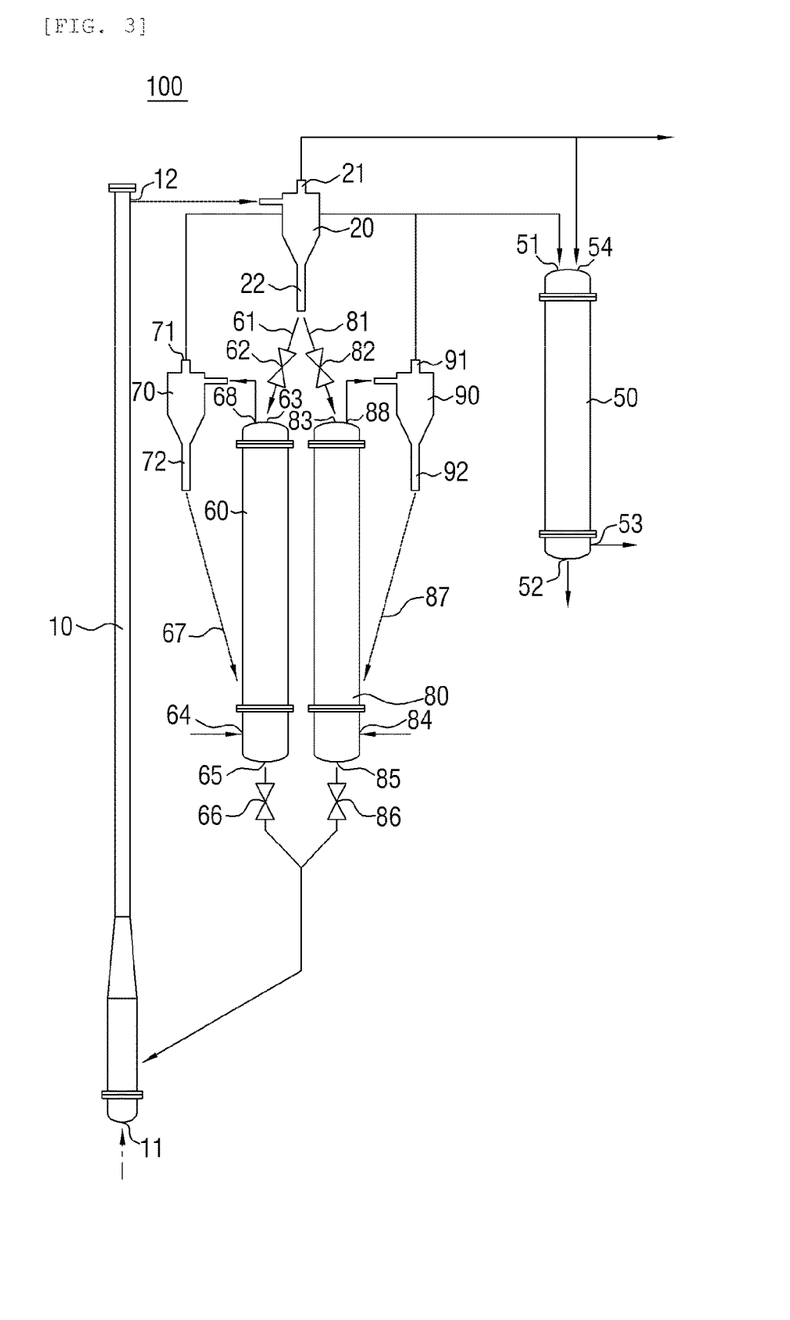
FIG. 3 is a diagram of a high temperature dry desulfurization system having a multi-regeneration reactor according to an exemplary embodiment of the present disclosure.

As illustrated in FIG. 3, the high temperature dry desulfurization system having the multi-regeneration reactor 100, unlike conventional apparatus, uses multi-regeneration reactors arranged in parallel. In a detailed exemplary of embodiment of the present disclosure, a configuration and process having two regeneration reactors, that is, a first regeneration reactor 60 and a second regeneration reactor 80 will be described. The number of the regeneration reactors will not be limited to the exemplary embodiment, the number is not limited if it is within the scope which enables achieving the technical spirit of the present disclosure by those skilled in the art.

As illustrated in FIG. 3, a difference with the conventional apparatus for desulfurization in the high temperature dry desulfurization system 100 according to an exemplary embodiment of the present disclosure is the desulfurizing agent that absorbed the sulfur ingredients which are emitted through solid outlet 22 of the desulfurization cyclone 20 is introduced in the first regeneration reactor 60 through a first regeneration reactor inlet pipe 61, and may be introduced in the second regeneration reactor 80 through a second regeneration reactor inlet 81. In addition, a first inlet valve 62 is provided in the first regeneration inlet pipe 61 and a second inlet valve 82 is provided in a second regeneration inlet pipe 81.

In addition, as illustrated in FIG. 3, a first desulfurizing agent outlet 65 is provided at the lower portion of the first reaction reactor 60, a first outlet valve 66 is installed in the outlet pipe, a second desulfurizing agent 85 is provided at the lower portion of the second regeneration reactor 80, and a second outlet valve 86 is installed in the outlet pipe.

Further, the first regeneration reactor 60 and the second regeneration reactor 80 are configured by connecting with a regeneration cyclone 70 and a regeneration cyclone 90. That is, a first recirculation outlet 80 of the upper portion of the first regeneration reactor 60 is connected with the first regeneration cyclone 70, desulfurizing agent particles discharged from solid outlet 72 of the first regeneration cyclone 70 recirculate to the first regeneration reactor 60 through a first recirculation inlet 67. In addition, a second recirculation outlet 88 at the upper portion of the second regeneration reactor 80 is connected with the second regeneration cyclone 90, and desulfurizing agent particles discharged from solid outlet 92 of the second regeneration cyclone 90 recirculate to the second regeneration reactor 80 through a second recirculation inlet 87.

Further, $SO_2$ and other gases discharged from gas outlet 71 of the first regeneration cyclone 70 are flowed into the sulfur recovery reactor 50 and $SO_2$ and other gases discharged gas from outlet 91 of the second regeneration cyclone 90 are flowed into the sulfur recovery reactor 50 as well.

As described hereinafter, the high temperature dry desulfurization system having the multi-regeneration reactor 100 according to an exemplary embodiment of the present disclosure includes the first regeneration reactor 60 and the second regeneration reactor 80 operated alternatively, one of the two regeneration reactors 60 and 80 is used only in solid recirculation in a continuously injectable state of the desulfurizing agent, the other may be used in a regeneration reaction, and, besides, a regeneration reaction may be performed by controlling a regeneration reaction time. By the configuration of the process and operating method, the flow of the oxygen into the sulfur recovery reactor 50 may be prevented.

As described hereinafter, in order to operate the first regeneration reactor 60 and the second regeneration reactor 80 alternatively, a controller 130 provides oxidizing agent (oxygen or air) within a specific regeneration reactor progressing the regeneration reaction by controlling a first oxidizing agent supplying means 110 and a second oxidizing agent supplying means, one of the first regeneration reactor 60 and the second regeneration reactor 80 operates the regeneration process and the other operates a solid recirculation process.

In addition, a regeneration reaction time is controlled by measuring whether oxygen is contained in gas discharged by the first regeneration reactor 60 in real time by supplying a first measuring sensor 69 at a first recirculation outlet 68 of the first regeneration reactor 60, and a regeneration reaction time is controlled by measuring whether the oxygen is contained in gas discharged by the second regeneration reactor 80 in real time by supplying a second measuring sensor 89 at a second recirculation outlet 88 of the second regeneration reactor 80.

Figure 4:
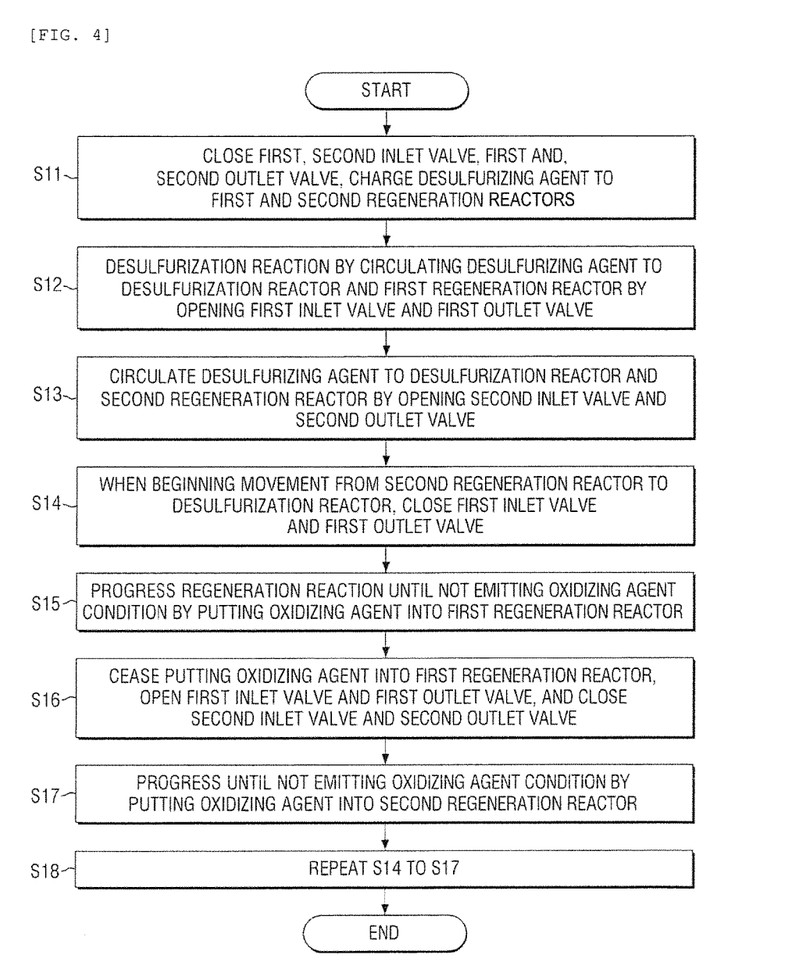
FIG. 4 is a flowchart of an operating method of a high temperature dry desulfurization system having a multi-regeneration reactor according to an exemplary embodiment of the present disclosure.

Hereinafter, an operating method of the high temperature dry desulfurization system having the multi-regeneration reactor 100 will be described. First, FIG. 4 illustrates the flowchart of the operating method of the high temperature dry desulfurization system having the multi-regeneration reactor according to an exemplary embodiment of the present disclosure.

Figure 5A:
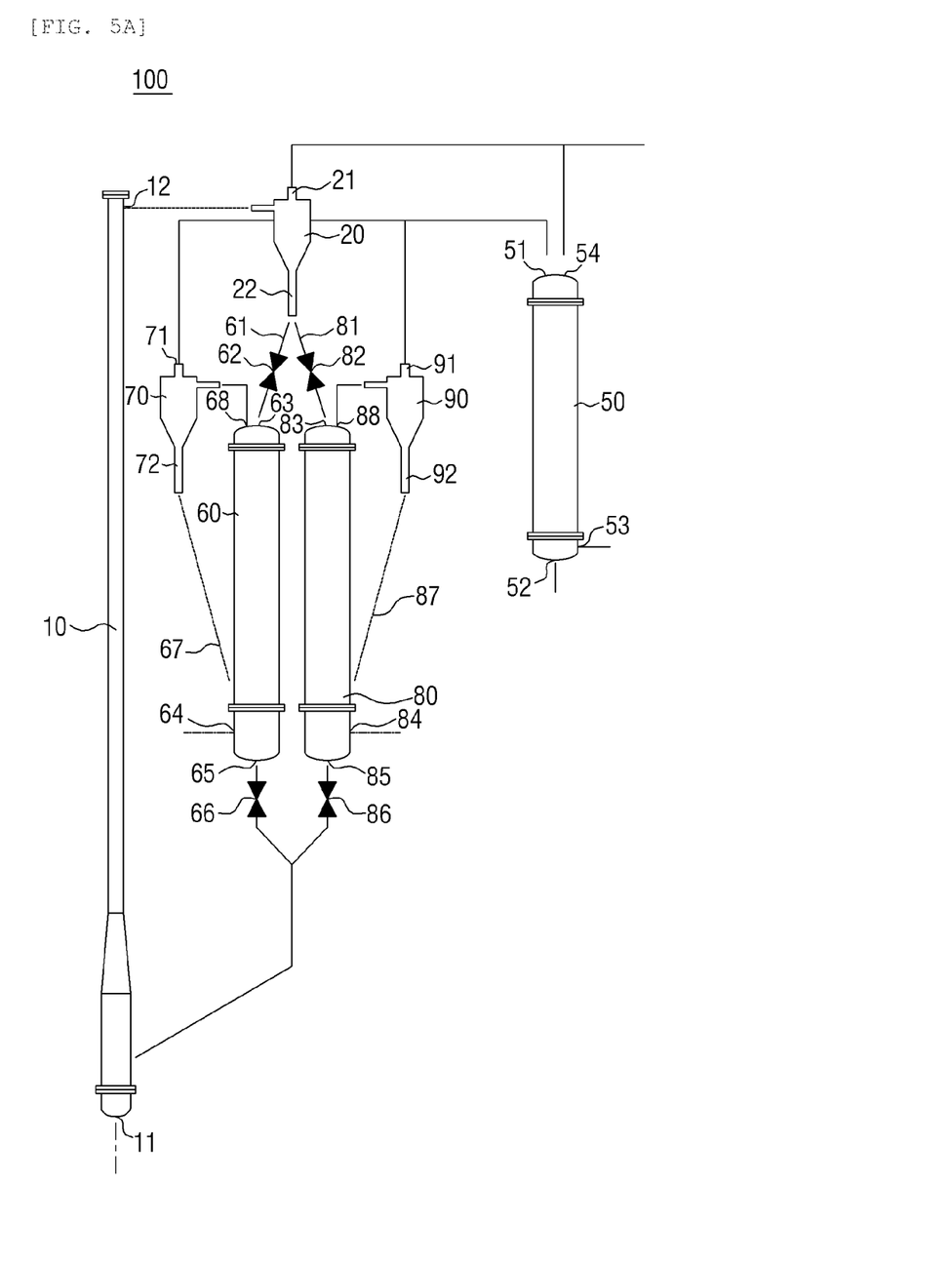
FIG. 5A is a diagram of a high temperature dry desulfurization system having a multi-regeneration reactor in a closed state of a first, second inlet valve, a first, second outlet valve according to an exemplary embodiment of the present disclosure.

First, initially, in a state with the first inlet valve 66 and 82 and the first outlet valve 66 and 68 all closed, the desulfurizing agent is charged in both the first regeneration reactor 60 and the second regeneration reactor 80. (S1) FIG. 5A illustrates the diagram of the high temperature dry desulfurization system 100 having the multi-regeneration reactor in a closed state of the first, and the second inlet valve 62, 82, and the first, and the second outlet valve 66, 86 according to an exemplary embodiment of the present disclosure.

Figure 5B:
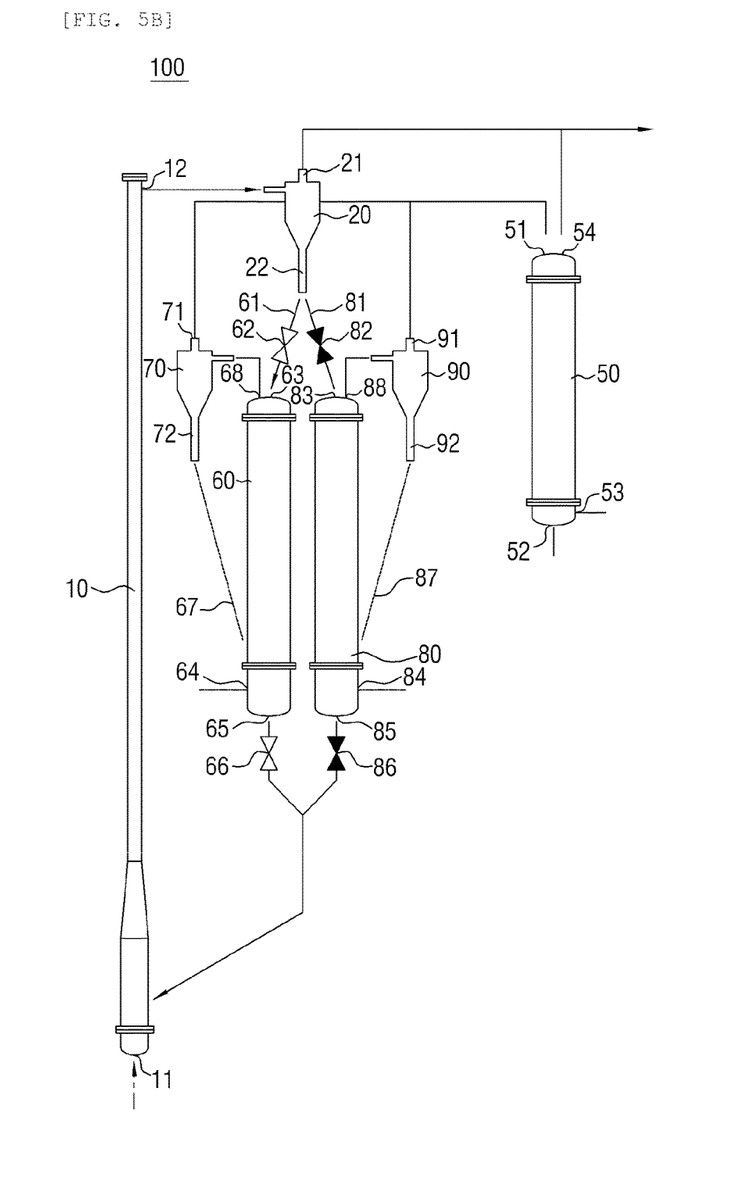
FIG. 5B is a diagram of a high temperature dry desulfurization system having a multi-regeneration reactor in a opened state of a first inlet valve and a first outlet valve according to an exemplary embodiment of the present disclosure.

Further, by opening the first inlet valve 62 and the first outlet valve 66, the desulfurizing agent causes a continuous desulfurization reaction by circulating between the desulfurization reactor 10 and the first regeneration reactor 60 (S12). FIG. 5B illustrates the diagram of the high temperature dry desulfurization system having the multi-regeneration reactor in the opened state of the first inlet valve 62 and the first outlet valve 66 according to an exemplary embodiment of the present disclosure.

As illustrated in FIG. 5B, when the first inlet valve 62 and the first outlet valve 62 are opened, the desulfurizing agent within the first regeneration reactor 60 flows into the desulfurization reactor 10 through the first outlet valve 66, the desulfurization reaction progresses within the desulfurization reactor 10 through the desulfurizing agent flowed into the desulfurization reactor 10, the synthetic gas with the removed sulfur ingredients is discharged through the gas outlet 21 of the desulfurization cyclone 20 by flowing the desulfurizing agent that absorbed the sulfur ingredients through the outlet 12 of the desulfurization reactor 10, and the desulfurizing agent that absorbed the sulfur ingredients is discharged through the solid outlet 22 of the desulfurization cyclone 20 and is flowed into the first regeneration reactor 60 through the opened first inlet valve 62.

In this case, because the first oxidizing agent supplying means 110 is not operated, the oxidizing agent (oxygen or air) is not injected through the first oxidizing agent inlet 64 of the lower portion of the first regeneration reactor 60 and the desulfurizing agent is transferred from the first regeneration reactor 60 to the desulfurization reactor 10 by gravity.

Further, the desulfurizing agent charged in the second regeneration reactor 80 is flowed into side of the desulfurization reactor 10 after the desulfurizing agent that absorbs sulfur in the desulfurization reactor 10. In this case, because the second oxidizing agent supplying means 120 is not operated, the oxidizing agent (oxygen or air) is not injected through the second oxidizing agent inlet 84 of the lower portion of the second regeneration reactor 80 and the desulfurizing agent is transferred from the second regeneration reactor 80 to the desulfurization reactor 10 by gravity (S13).

Further, after the desulfurizing agent is transferred from the second regeneration reactor 80 to the desulfurization reactor 10, the first regeneration reactor 60 is isolated from continuous solid flow by closing the first inlet valve 62 and the first outlet valve 66 (S14).

Then, the controller 130 progresses the regeneration reaction within the first regeneration reactor 60 by injecting the oxidizing agent (oxygen or air) through the first oxidizing agent inlet 64 provided at the lower portion of the first regeneration reactor 60 by operating the first oxidizing agent supplying means 110.

Figure 5C:
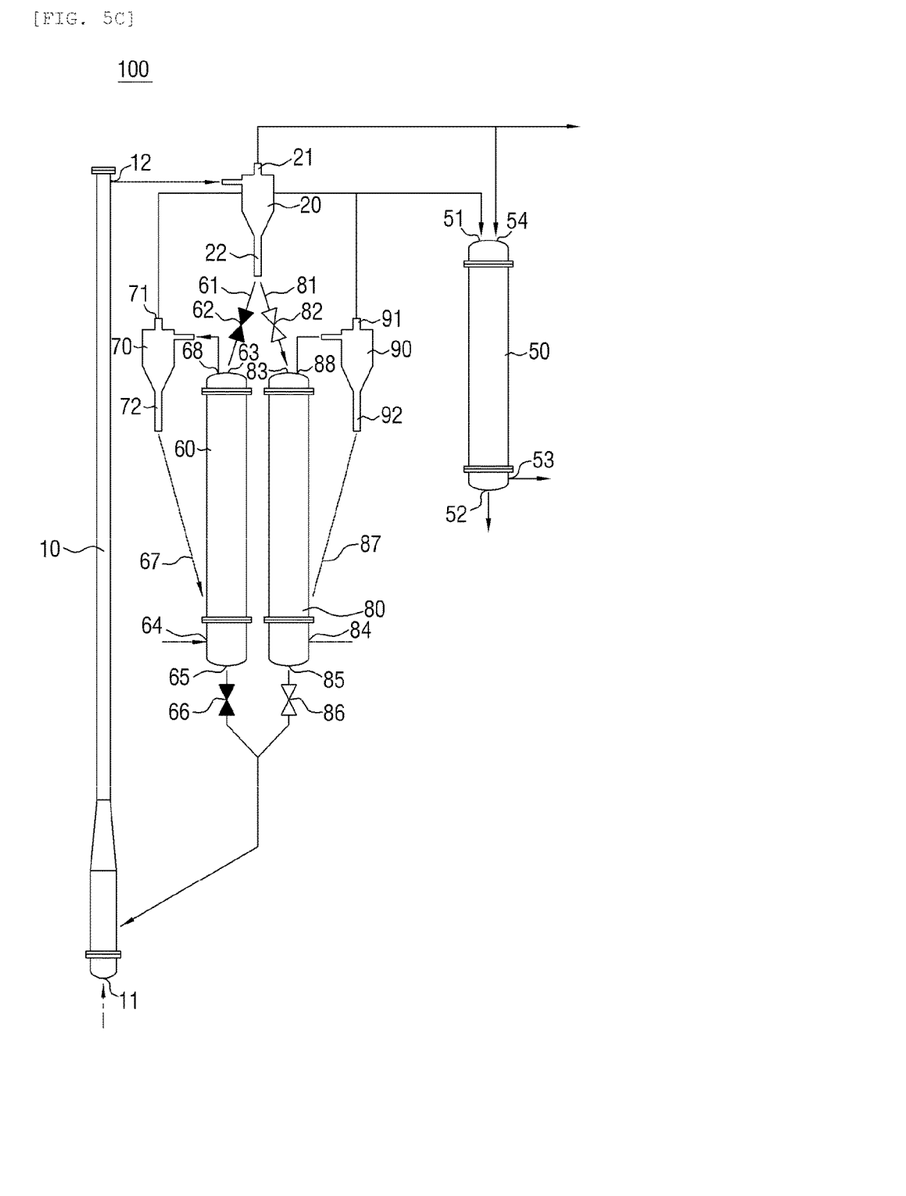
FIG. 5C is a diagram of a high temperature dry desulfurization system having a multi-regeneration reactor with a closed first inlet valve and the first outlet valve, putting an oxidizing agent within a first regeneration reactor, and having multi-regeneration reactor in a opened state of the second inlet valve and the second outlet valve according to an exemplary embodiment of the present disclosure.

FIG. 5C illustrates the diagram of the high temperature dry desulfurization system 100 which closes the first inlet valve 62 and the first outlet valve 66, puts the oxidizing agent within the first regeneration reactor 60, and has the multi-regeneration reactor in an opened state of the second inlet valve 82 and the second outlet valve 86 according to an exemplary embodiment of the present disclosure.

As illustrated in FIG. 5C, the regeneration reaction progresses by supplying the oxidizing agent to the inside in the first regeneration reactor 60, and the desulfurization reaction progresses by supplying and circulating the desulfurizing agent to the desulfurization reactor 10 in the second regeneration reactor 80.

That is, in the first regeneration reactor 60 closed are the first inlet valve 62 and the first outlet valve 66, the regeneration reaction of aforementioned Formula 3 progresses by supplying the oxidizing agent (oxygen or air) through the first oxidizing inlet 64, the desulfurizing agent, $SO_2$, and other gases are discharged through the first recirculation outlet 68 of the first regeneration reactor 60 and are introduced in the first regeneration cyclone 70. Further, in the first regeneration cyclone 70, gas and solid are divided, the $SO_2$ and other gases are discharged through the gas outlet 71 of the first regeneration cyclone 70 and are flowed into the sulfur recovery reactor 50. Further, the desulfurizing agent recirculates again through the first recirculation inlet 67 to the first regeneration reactor 60.

In addition, $SO_2$ flowed into the sulfur recovery reactor 50 is recovered through the sulfur outlet 52 by the catalyst and reaction of aforementioned Formulas 4 and 5. Further, while the regeneration reaction is occurring in the first regeneration reactor 60, the desulfurizing agent progresses in the desulfurization process by circulating through the desulfurization reactor 10 and the second regeneration reactor 80 and absorbing the sulfur ingredients.

The first regeneration reactor 60 is operated by the regeneration process, in the case of the second regeneration reactor 80, an operated time for desulfurization reaction may be calculated based on an amount of the sulfur ingredients absorbed in the desulfurization reactor 10 and a solid charging amount of the regeneration reactor, and that progresses until the not emitting oxygen condition (S15). That is, the first measuring sensor 69 measures this condition in real time, in the case that is emitted, the controller 130 switches its mode.

That is, if the mode is switched, contrary to FIG. 5C, the desulfurization reaction progresses by circulating the desulfurizing agent between the first regeneration reactor 60 and the desulfurization reactor 10, and the regeneration reaction progresses in the second reaction reactor 80.

Figure 5D:
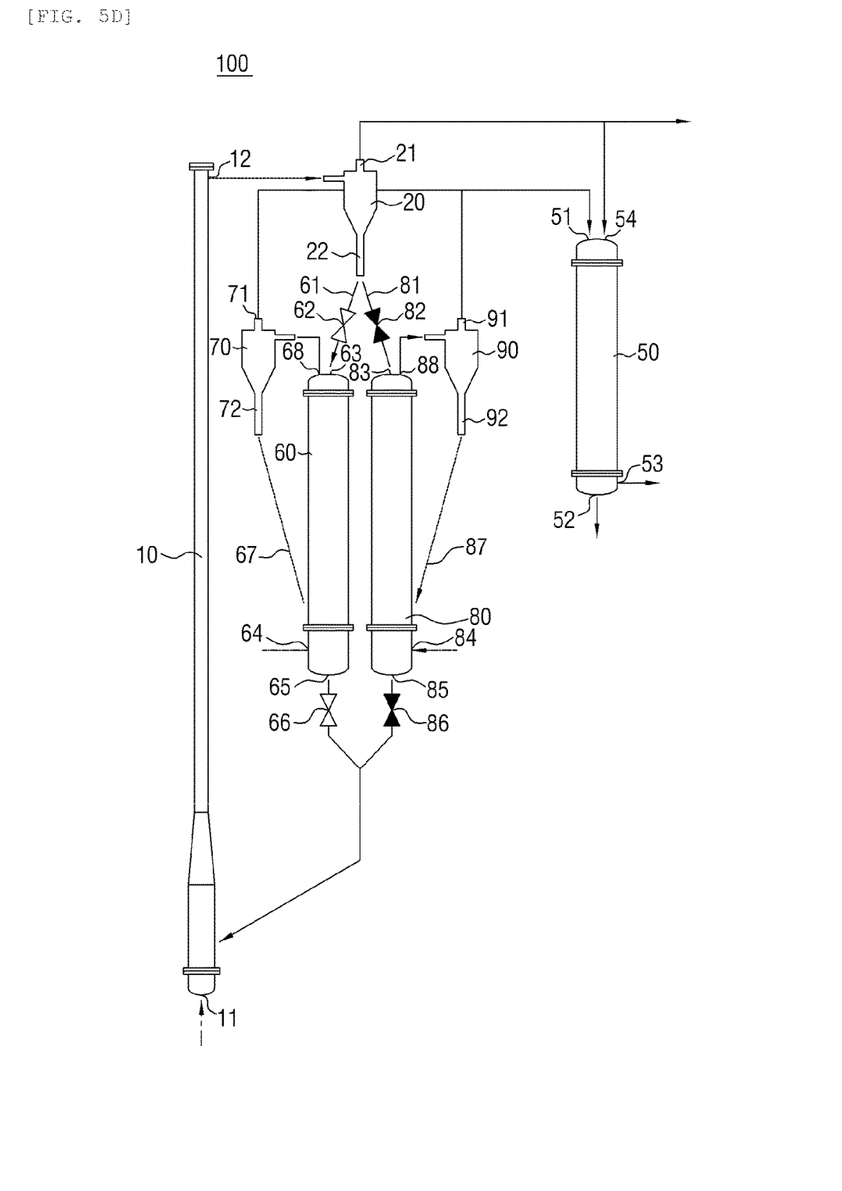
FIG. 5D is a diagram of a high temperature dry desulfurization system having a multi-regeneration reactor with a closed second inlet valve and the second outlet valve, and putting an oxidizing agent within a second regeneration reactor, in a opened state of the first inlet valve and the first outlet valve according to an exemplary embodiment of the present disclosure.

In other words, when the regeneration reaction time in the first regeneration reactor 60 is ended, after blocking oxidizing agent injection through the first oxidizing agent inlet 64 by stopping operation of the first oxidizing agent supplying means 110, regenerated desulfurizing agent by opening the first inlet valve 62 and the first outlet valve 66 is provided to the desulfurization reactor 10 through the first desulfurizing agent outlet 65, and the second reaction reactor 80 is isolated from the continuous solid flow by closing the second inlet valve 82 and the second outlet valve 86 simultaneously (S16).

That is, the desulfurizing agent is regenerated by a reaction as like Formula 3 within the second regeneration reactor 80 by injecting the oxidizing agent (oxygen or air) to the second oxidizing agent inlet 84 of the second regeneration reactor 80 by operating the second oxidizing agent supplying means 120, the desulfurizing agent, $SO_2$, and other gases are discharged through the second recirculation outlet 68 of the second regeneration reactor 80 and are introduced in the second regeneration cyclone 90. Further, the air and the solid are divided in the second regeneration cyclone 90, the $SO_2$, and other gases are discharged to the gas outlet 91 and flowed into the sulfur recovery reactor 50. Further, the desulfurizing agent recirculates to the second regeneration reactor 80 through the second recirculation inlet 87.

Also, $SO_2$ is flowed into the sulfur recovery reactor 50 and sulfur is recovered through the sulfur outlet 52 by the catalyst and the reaction of aforementioned Formulas 4 and 5. Further, while the regeneration reaction occurs in the second regeneration reactor 80, the desulfurizing agent progresses the desulfurization process by circulating through the desulfurization reactor 10 and the first regeneration reactor 60 and absorbing the sulfur ingredients (S17).

The second regeneration reactor 80 is operated by the regeneration process, in the case of the first regeneration reactor 60, an operated time for the desulfurization reaction may be calculated based on an amount of the sulfur ingredients absorbed in the desulfurization reactor 10 and a solid charging amount of the regeneration reactor, and progresses until the not emitting oxygen condition. FIG. 5D illustrates the diagram of the high temperature dry desulfurization system 100 having the multi-regeneration reactor with the second inlet valve 82 and the second outlet valve 86 closed, putting the oxidizing agent within the second regeneration reactor 80, and having the multi-regeneration reactor in the opened state of the first inlet valve 62 and the first outlet valve 66 according to an exemplary embodiment of the present disclosure.

As FIG. 5C and FIG. 5D are to be operated by alternating repeatedly each other, in a continuously injectable state of the desulfurizing agent to the desulfurization reactor 10, one of the two regeneration reactors is used only in solid recirculation, the other may be used in the regeneration reaction, and, may be performed until the regeneration reactor is not emitting oxygen by controlling the regeneration reaction time. Therefore, flowing oxygen into the direct sulfur recovery process may be prevented by this process and configuration.

Figure 6:
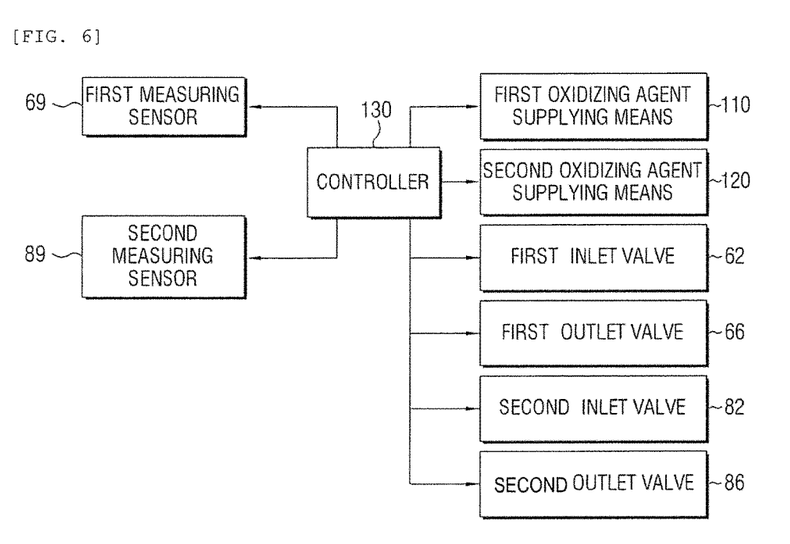
FIG. 6 is a block diagram of signal flow of a controller according to an exemplary embodiment of the present disclosure.

FIG. 6 illustrates the block diagram of the signal flow of the controller 130 according to an exemplary embodiment of the present disclosure. As illustrated in FIG. 6, in the case that the first regeneration reactor 60 progresses the regeneration reaction until the first measuring sensor 69 measures the value required to the end of the regeneration reaction time.

In other words, the first measuring sensor 69 measures the amount of the sulfur ingredients absorbed in the desulfurization reactor 10 and the solid charging amount of the first regeneration reactor 60, whether emitting oxygen in the first regeneration reactor 60, and the controller 130 determines whether the regeneration mode of the first regeneration reactor 60 continues based on the measurement value thereof.

The second measuring sensor 89 also measures the value required to end the regeneration reaction time in the case that the second regeneration reactor 80 progresses the regeneration reaction. In other words, the second measuring sensor 89 measures the amount of the sulfur ingredients absorbed in the desulfurization reactor 10 and the solid charging amount of the second regeneration reactor 80, whether oxygen is emitted in the second regeneration reactor 80, and the controller 130 determines whether the regeneration mode of the second regeneration reactor 80 continues based on the measurement value thereof.

Further, the controller 130 is operated by switching the system 100 to a mode by controlling operation of the first oxidizing agent supplying means 110, the second oxidizing agent supplying means 120, the first inlet valve 62, the first outlet valve 66, the second inlet valve 82, and the second outlet valve 86. In other words, the desulfurization reaction progresses by circulating the solid between the first regeneration reactor 60 and the desulfurization reactor 10, the second regeneration reactor 80 operates in order that the regeneration reaction is operated, the controller 130 opens the first inlet valve 62 and the first outlet valve 66, closes the second inlet valve 82 and the second outlet valve 86, and controls the second oxidizing agent supplying means 120. In addition, desulfurization reaction progresses by circulating the solid between the second regeneration reactor 80 and the desulfurization reactor 10, the first regeneration reactor 60 operates in order that the regeneration reaction is operated, the controller 130 opens the second inlet valve 82 and the second outlet valve 86, closes the first inlet valve 62 and the first outlet valve 66, and controls the first oxidizing agent supplying means 110.

Further, in the apparatus and the method thereof described above, the configuration and method of embodiments as described above may not be applied with limitation, but the embodiments may be configured by selectively combining all or a part of each embodiment such that various modifications may be made.

What is claimed is:

1. A desulfurization system for removing sulfur included in a synthetic gas in a high temperature dry state, comprising:
    a desulfurization reactor for removing sulfur from the synthetic gas using a desulfurizing agent;
    a desulfurization cyclone for separating the synthetic gas and the desulfurizing agent discharged from the desulfurization reactor;
    a first regeneration reactor to be coupled to the desulfurization cyclone for regenerating the desulfurizing agent;
    a second regeneration reactor to be coupled to the desulfurization cyclone for regenerating the desulfurizing agent;
    a first oxidizing agent supply for injecting oxidizing agent into the first regeneration reactor, and a second oxidizing agent supply for injecting oxidizing agent into the second regeneration reactor;
    a first inlet valve coupled between the desulfurization cyclone and a first inlet of the first regeneration reactor, a first outlet valve at a first outlet of the first regeneration reactor, a second inlet valve coupled between the desulfurization cyclone and a second inlet of the second regeneration reactor, and a second outlet valve at a second outlet of the second regeneration reactor;
    a controller for operating one of the first regeneration reactor and the second regeneration reactor in a regeneration mode, and for operating the other regeneration reactor in a desulfurization mode by circulating the desulfurizing agent with the desulfurization reactor, when operating the first regeneration reactor in the regeneration mode, closing the first inlet valve and the first outlet valve, and operating the first oxidizing agent supply, when operating the second regeneration reactor in the regeneration mode, closing the second inlet valve and the second outlet valve, and operating the second oxidizing agent supply;

a first regeneration cyclone for separating gas and solid discharged through a first recirculation outlet of the first regeneration reactor and recirculating the solid through a first recirculation inlet of the first regeneration reactor when the first regeneration reactor operates in the regeneration mode;

a second regeneration cyclone for separating gas and solid discharged through a second recirculation outlet of the second regeneration reactor and recirculating the solid through a second recirculation inlet of the second regeneration reactor when the second regeneration reactor operates in the regeneration mode;

a first measuring sensor for measuring whether oxygen is discharged by the first regeneration reactor when the first regeneration reactor operates in the regeneration mode; and a second measuring sensor for measuring whether oxygen is discharged by the second regeneration reactor when the second regeneration reactor operates in the regeneration mode;

the controller for
determining whether the regeneration mode of the first regeneration reactor has ended based on the first measuring sensor, and determining whether the regeneration mode of the second regeneration reactor has ended based on the second measuring sensor, and when the first regeneration reactor operates in the regeneration mode, gas including the desulfurizing agent is discharged by the first regeneration reactor and sulfur is flowed into the first regeneration cyclone, the desulfurization agent is discharged from the first outlet of the first regeneration cyclone and recirculates to the first regeneration reactor, and the gas including sulfur is flowed into a sulfur recovery reactor, when the second regeneration reactor operates in the regeneration mode, gas including the desulfurizing agent is discharged by the second regeneration reactor and sulfur is flowed into the second regeneration cyclone, the desulfurization agent is discharged from the second outlet of the second regeneration cyclone and recirculates to the second regeneration reactor, and the gas including sulfur is flowed into the sulfur recovery reactor.

2. A high temperature dry desulfurization method comprising:

performing a first stage putting a desulfurizing agent into a desulfurization reactor by opening a first inlet valve of a first regeneration reactor and opening a first outlet valve of the first regeneration reactor, and opening a second inlet valve of a second regeneration valve reactor and opening a second outlet valve of the second regeneration reactor;

performing a second stage by operating the first regeneration reactor in a regeneration mode by putting an oxidizing agent into the first regeneration reactor by closing the first inlet valve and the first outlet valve, and performing a desulfurization reaction by circulating the desulfurizing agent with the desulfurization reactor;

performing a third stage by operating the second regeneration reactor in the regeneration mode by putting an oxidizing agent into the second regeneration reactor by closing the second inlet valve and the second outlet valve when regeneration of the first regeneration reactor is ended, and performing the desulfurization by circulating the desulfurizing agent with the desulfurization reactor; and performing a fourth stage by repeating the second stage and the third stage.

3. The method of claim 2, wherein performing the first stage comprises using a controller to close the first inlet valve, the first outlet valve, the second inlet valve, and the second outlet valve, and charging the desulfurizing agent in the first regeneration reactor and in the second regeneration reactor;

circulating the desulfurizing agent in the first regeneration reactor with the desulfurization reactor by using the controller to open the first inlet valve and the first outlet valve; and circulating the desulfurizing agent in the second regeneration reactor with the desulfurization reactor by using the controller to open the second inlet valve and the second outlet valve.

4. The method of claim 3, wherein operating the first regeneration reactor in the regeneration mode comprises regenerating the desulfurizing agent by injecting oxidizing agent into the first regeneration reactor; flowing gas including the desulfurizing agent and sulfur into a first regeneration cyclone through a first recirculation outlet of the first regeneration reactor; regenerating the desulfurizing agent by circulating the first regeneration reactor through the first regeneration cyclone; and recovering sulfur by flowing the gas including sulfur through a gas outlet of the first regeneration cyclone; and wherein operating the second regeneration reactor in the desulfurization mode comprises controlling sulfur of a synthetic gas in the desulfurization reactor by flowing the desulfurizing agent within the second regeneration reactor into the desulfurization reactor, flowing the desulfurizing agent and the synthetic gas from the desulfurization reactor into a desulfurization cyclone, emitting the synthetic gas from the desulfurization cyclone and circulating the desulfurizing agent into the second regeneration reactor.

5. The method of claim 4, comprising using a first measuring sensor to measure whether the first regeneration reactor discharges oxygen, and determining, by using the controller, whether regeneration of the first regeneration reactor is terminated based on the first measuring sensor.

6. The method of claim 5, wherein operating the second regeneration reactor in the regeneration mode in the third stage comprises regenerating the desulfurizing agent by injecting the oxidizing agent into the second regeneration reactor; flowing gas including the desulfurizing agent and sulfur into a second regeneration cyclone through a second recirculation outlet of the second regeneration reactor; regenerating the desulfurizing agent by circulating the second regeneration reactor through the second regeneration cyclone; and recovering sulfur by flowing the gas including sulfur through a gas outlet of the second regeneration cyclone;

wherein operating the first regeneration reactor in the desulfurization mode comprises controlling sulfur of the synthetic gas in the desulfurization reactor by flowing the desulfurizing agent within the first regeneration reactor into the desulfurization reactor, flowing the desulfurizing agent and the synthetic gas from the desulfurization reactor into the desulfurization cyclone, emitting the synthetic gas from the desulfurization cyclone and circulating the desulfurizing agent into the first regeneration reactor.

7. The method of claim 6, comprising using a second measuring sensor to measure whether the second measuring sensor of the second regeneration reactor discharges oxygen, and determining, by using the controller, whether regeneration of the second regeneration reactor is terminated based on a measurement value of the second measuring sensor.

\* \* \* \* \*